United States Patent
Iwamiya et al.

(10) Patent No.: US 11,307,537 B2
(45) Date of Patent: Apr. 19, 2022

(54) COMMUNICATION DEVICE, COMMUNICATION METHOD, COMMUNICATION SYSTEM, ELECTRONIC WATCH, AND PROGRAM

(71) Applicant: CASIO COMPUTER CO., LTD., Tokyo (JP)

(72) Inventors: Hiroshi Iwamiya, Ome (JP); Sadao Nagashima, Tokorozawa (JP); Satomi Michitsuta, Machida (JP); Makoto Nakagawa, Ome (JP); Toyokazu Nishio, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 791 days.

(21) Appl. No.: 16/081,065

(22) PCT Filed: Dec. 7, 2016

(86) PCT No.: PCT/JP2016/086420
§ 371 (c)(1),
(2) Date: Aug. 30, 2018

(87) PCT Pub. No.: WO2017/149889
PCT Pub. Date: Sep. 8, 2017

(65) Prior Publication Data
US 2019/0072913 A1    Mar. 7, 2019

(30) Foreign Application Priority Data

Mar. 1, 2016  (JP) .............................. JP2016-038536

(51) Int. Cl.
*G04R 20/02* (2013.01)
*G04R 20/06* (2013.01)
(Continued)

(52) U.S. Cl.
CPC ............... *G04R 20/06* (2013.01); *G04G 7/02* (2013.01); *G04R 20/14* (2013.01); *G04R 20/26* (2013.01);
(Continued)

(58) Field of Classification Search
CPC ........ G04R 20/30; G04R 20/06; G04R 20/26; G04R 20/14; G04R 20/02; G04G 7/02
See application file for complete search history.

(56) References Cited

U.S. PATENT DOCUMENTS 6,728,533 B2 * 4/2004 Ishii ................. H04M 1/72451
455/425
8,009,519 B2 * 8/2011 Jazra ...................... G04R 20/14
368/47

(Continued)

FOREIGN PATENT DOCUMENTS

CN      1192637 A     9/1998
CN    102323743 A     1/2012
(Continued)

OTHER PUBLICATIONS

First Office Action dated Oct. 30, 2019 received in Chinese Patent Application No. CN 201680083057.X together with an English language translation.
(Continued)

*Primary Examiner* — Sean Kayes
(74) *Attorney, Agent, or Firm* — Scully Scott Murphy & Presser

(57) ABSTRACT

A communication system (1) comprises a central (100) and a peripheral (200). The central (100) receives location information and time information from NTP servers (10) and a location server (30). The central (100) creates first offset information of the time measured by its own device and the time information received from the NTP servers (10). The
(Continued)

central (100) acquires from map information a time difference corresponding to a location presented by the location information received from the location server (30). The central (100) creates first updated time information based on the time measured by its own device, first offset information, and time difference corresponding to the location presented by the location information received from location server (30) and transmits the first updated time information to the peripheral (200). The peripheral (200) changes the time displayed by its own device based on the received first updated time information.

9 Claims, 6 Drawing Sheets

(51) Int. Cl.
*G04R 20/26* (2013.01)
*G04R 20/14* (2013.01)
*H04W 4/80* (2018.01)
*G04G 7/00* (2006.01)
*G04R 20/30* (2013.01)
*H04W 92/08* (2009.01)

(52) U.S. Cl.
CPC .............. *G04R 20/30* (2013.01); *H04W 4/80* (2018.02); *H04W 92/08* (2013.01); *G04R 20/02* (2013.01)

(56) References Cited

U.S. PATENT DOCUMENTS

| | | | |
|---|---|---|---|
| 2002/0098857 A1* | 7/2002 | Ishii | G04G 9/0011 |
| | | | 455/502 |
| 2009/0028006 A1* | 1/2009 | Ha | G06F 1/14 |
| | | | 368/46 |
| 2009/0219205 A1 | 9/2009 | Jazra et al. | |
| 2011/0280108 A1 | 11/2011 | Honda | |
| 2017/0038740 A1* | 2/2017 | Knappe | G04G 9/0076 |
| 2017/0123382 A1* | 5/2017 | Ruzicka | G04G 9/0076 |
| 2017/0350984 A1* | 12/2017 | Nishi | G04G 5/00 |
| 2018/0017946 A1* | 1/2018 | Kyou | G04R 20/26 |

FOREIGN PATENT DOCUMENTS

| | | |
|---|---|---|
| CN | 104281049 A | 1/2015 |
| CN | 104640190 A | 5/2015 |
| JP | 2007-085883 A | 4/2007 |
| JP | 2009-118403 A | 5/2009 |
| JP | 2011-237314 A | 11/2011 |
| JP | 2013-130562 A | 7/2013 |

OTHER PUBLICATIONS

International Search Report and Written Opinion dated Mar. 7, 2017 issued in PCT/JP2016/086420.
Notification of Reasons for Refusal dated Jun. 5, 2018 issued in JP 2016-038536.
Extended European Search Report dated Sep. 19, 2019 received in European Patent Application No. EP 16892724.2.
The Notification of the Third Office Action dated Jan. 25, 2021 received in Chinese Patent Application No. CN 201680083057.X together with an English language translation.

* cited by examiner

COMMUNICATION DEVICE, COMMUNICATION METHOD, COMMUNICATION SYSTEM, ELECTRONIC WATCH, AND PROGRAM

TECHNICAL FIELD

The present invention relates to a communication device, communication method, communication system, electronic watch, and program.

BACKGROUND ART

In recent years, wireless communication devices performing wireless communication based on the Bluetooth (registered trademark), a short range wireless communication standard, have increasingly become popular.

For example, Patent Literature 1 discloses a time correction system comprising a cell-phone (AG) and wristwatch-type terminal device (BTW) connected through short range wireless communication. In this time correction system, the wristwatch-type terminal device acquires time information from the cell-phone through wireless communication based on the Bluetooth (™) and corrects the time of its own device based on the time information. The cell-phone corrects the time of its own device based on time data acquired from the cell-phone network (carrier network).

CITATION LIST

Patent Literature

[PTL 1]
Unexamined Japanese Patent Application Kokai Publication No. 2009-118403

SUMMARY OF INVENTION

Technical Problem

According to the time correction system of the Patent Literature 1, the time of the wristwatch-type terminal device depends on the time information of the cell-phone. The time information of the cell-phone depends on the time data provided from the carrier network.

With the above configuration, if the time data provided from the carrier network are not correct, the displayed time of the wristwatch-type terminal device is not correct, either. In fact, it is likely to happen that time data provided from a carrier network are not correct.

Then, the present disclosure is made with the view of the above circumstance and an objective of the disclosure is to provide a communication device and the like improving the accuracy of the displayed time.

Solution to Problem

In order to achieve the above objective, the communication device according to a first exemplary aspect of the present disclosure is a communication device, comprising:

a communicator receiving location information and time information from a server;

a memory storing map information that is information associating locations and time differences; and a processor measuring time and performing control operations, wherein the processor creates first offset information of the measured time and the time information received by the communicator;

acquires from the map information a time difference corresponding to a location presented by the location information received by the communicator;

creates first updated time information based on the measured time, the first offset information, and the time difference corresponding to the location presented by the location information received by the communicator; and makes the communicator transmit the first updated time information to another communication device.

Moreover, in order to achieve the above objective, the communication device according to a second exemplary aspect of the present disclosure is a communication device, comprising:

a processor measuring time and performing control operations; and a receiver receiving from another communication device first updated time information of an area where the other communication device is located, which is created based on time information and location information from a server and a local time difference and time difference due to the daylight saving time pre-stored by the other communication device, wherein the processor changes the time measured by the processor based on the first updated time information received by the receiver.

Advantageous Effects of Invention

With the present disclosure, it is possible to improving the accuracy of the displayed time.

DESCRIPTION OF EMBODIMENTS (Embodiment)

Figure 1:
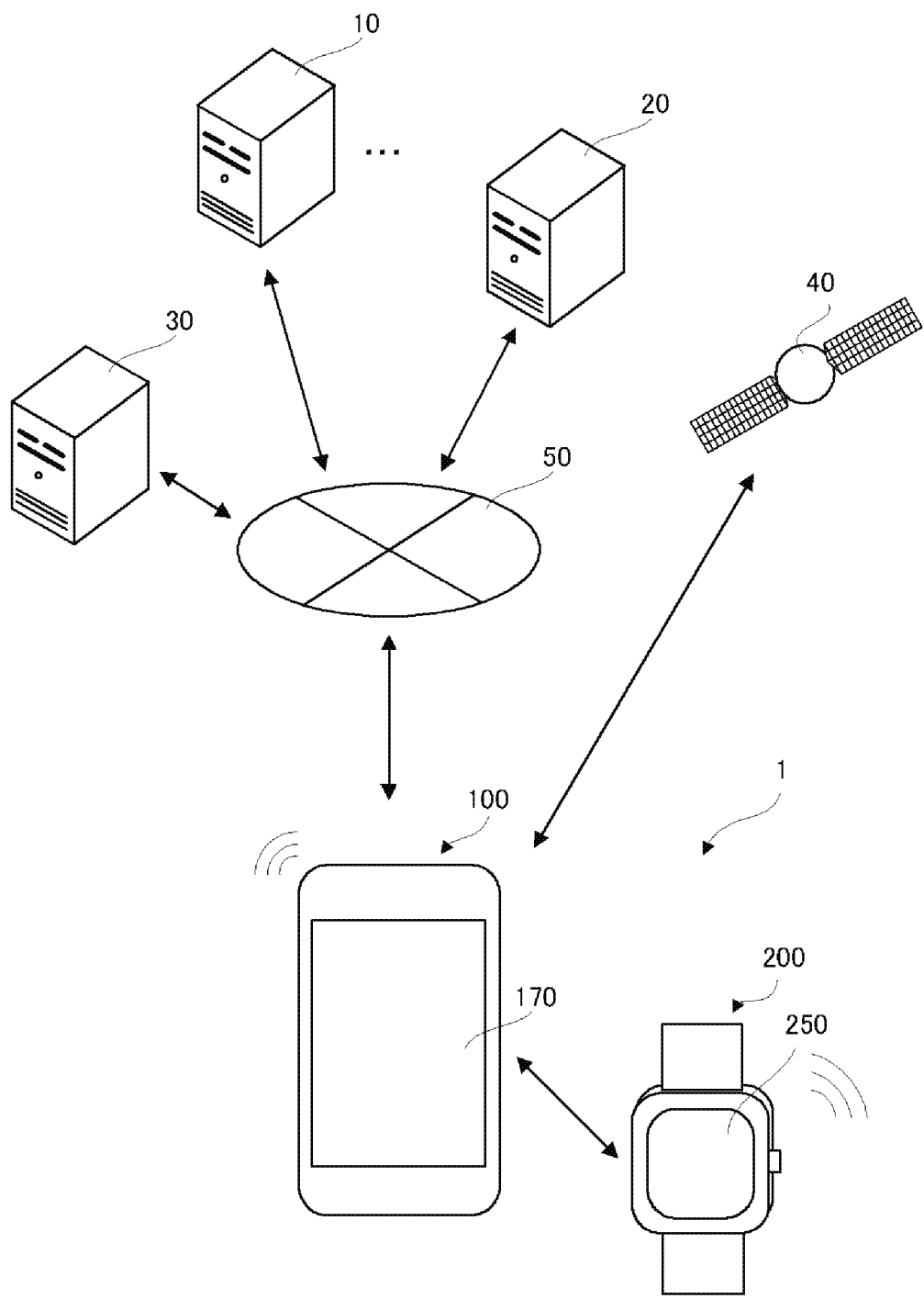
FIG. 1 is an illustration showing an exemplary configuration of the communication system according to an embodiment.

An embodiment of the present disclosure will be described hereafter with reference to the drawings. As shown in FIG. 1, a communication system 1 according to an embodiment of the present disclosure comprises a central 100 that is a wireless communication device and a peripheral 200 that is another wireless communication device different from the central 100.

The central 100 and peripheral 200 mutually communicate through short range wireless communication based on the Bluetooth (registered trademark) low energy (BLE, hereafter). The BLE is a standard (mode) designed with intent to pursuit low energy consumption in a short range wireless communication standard called the Bluetooth (registered trademark).

Here, the central 100 provides services to the peripheral 200. The peripheral 200 uses the services provided by the central 100.

The central 100 and peripheral 200 are, for example, terminals that are portable and capable of wireless communication based on the BLE such as cell-phones, smart-phones, tablet-type personal computers, note-type personal computers, and watches.

In this embodiment, the central 100 is a smart-phone and the peripheral 200 is an electronic watch displaying the time on a display 250 by way of example.

The central 100 receives radio waves from a satellite 40. The satellite 40 is, for example, a satellite used for positioning such as global positioning systems (GPSs) and global navigation satellite systems (GLONASSs).

Moreover, the central 100 communicates with other devoices connected to a world area network (WAN) 50 via not shown relay devices, access points, and the like. The other devices include multiple network time protocol servers 10 providing time information, a network time protocol-pool (NTP pool) server 20, and a location server 30 providing location information.

Accessed by a communication terminal, the NTP pool server 20 identifies the location of the communication terminal by making reference to a location database with the Internet Protocol (IP) of the communication terminal. The NTP pool server 20 assigns local NTP servers 10 corresponding to the location of the communication terminal among the multiple NTP servers 10. Generally, multiple (for example, four) NTP servers 10 are assigned. The communication terminal receives NTP packets from the assigned NTP servers 10 and acquires time information.

Here, "time information" in this embodiment is information presenting a universal time coordinated (UTC) time. However, the time information in the present disclosure is not restricted to information presenting a UTC time and can be information presenting a standard time or any information serving as reference for the time. For example, the time information may be information presenting the Greenwich Mean Time (GMT). Moreover, "time" includes not only the hour and minute but also the date. "Location information" in this embodiment is information presenting the current location (latitude and longitude) of a communication terminal of interest.

Figure 2:
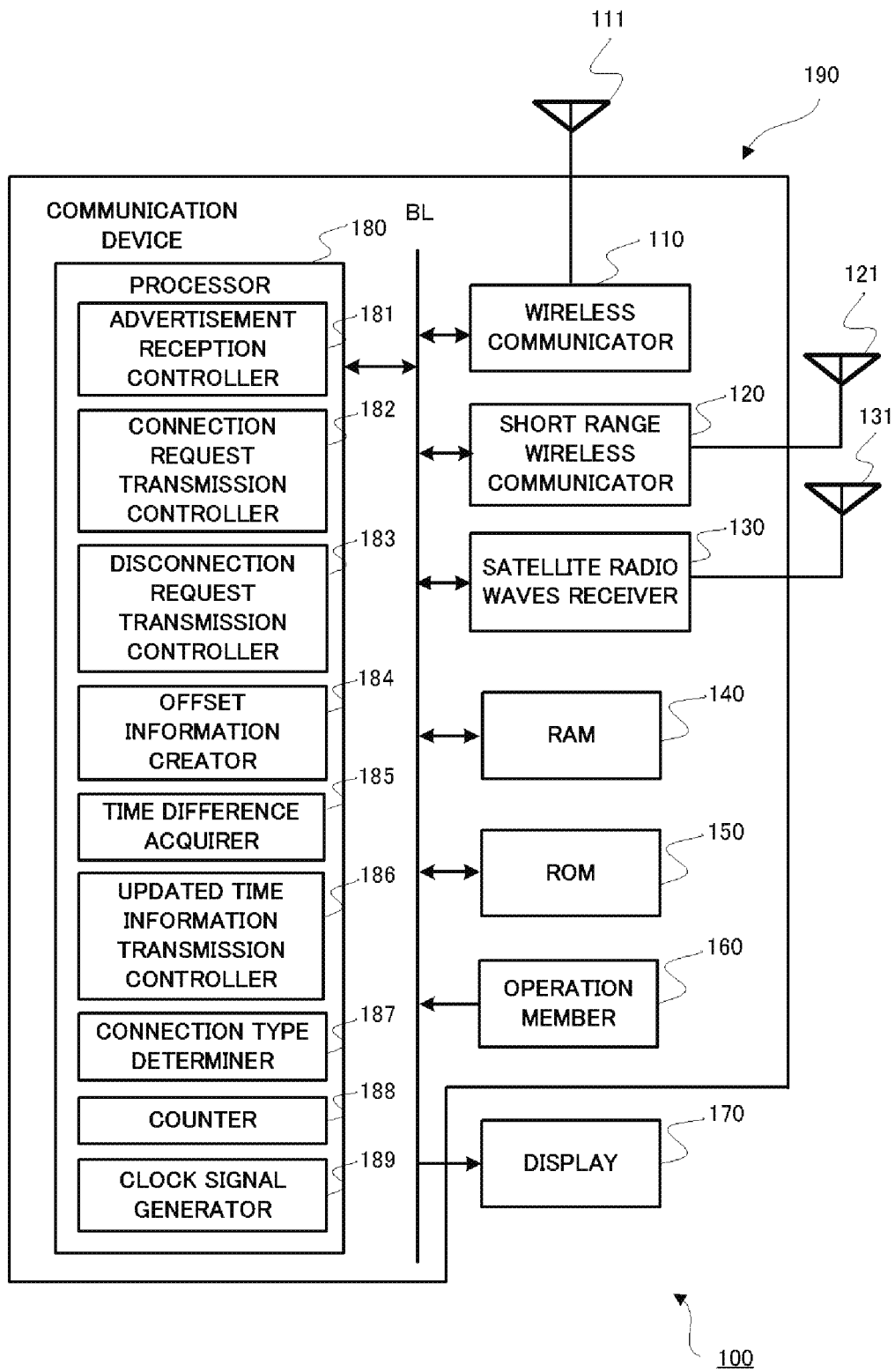
FIG. 2 is a block diagram showing an exemplary configuration of the central according to the embodiment.

The configuration of the central 100 according to this embodiment will be described hereafter. As shown in FIG. 2, the central 100 comprises a communication device 190 and a display 170. The communication device 190 comprises a wireless communicator 110, a short range wireless communicator 120, a satellite radio waves receiver 130, a random access memory (RAM) 140, a read only memory (ROM) 150, an operation member 160, and a processor 180. These components of the communication device 190 and the display 170 are mutually connected by a bus line BL.

The wireless communicator 110 comprises, for example, a radio frequency (RF) circuit, base band (BB) circuit, large scale integration (LSI) circuit, or the like. The wireless communicator 110 wirelessly communicates with relay devices, access points, and the like via an antenna 111. The wireless communicator 110 is connected to the WAN 50 via relay devices, access points, and the like to communicate with the NTP servers 10, NTP pool (NTP-pool) server 20, and location server 30.

The short range wireless communicator 120 comprises, for example, a radio frequency circuit, base band circuit, large scale integration circuit, or the like. The short range wireless communicator 120 receives/transmits signals via an antenna 121 and communicates with the peripheral 200 that is another wireless communication device based on the BLE.

The satellite radio waves receiver 130 comprises, for example, a radio frequency circuit, base band circuit, large scale integration circuit, or the like. The satellite radio waves receiver 130 receives radio waves from the satellite 40 via an antenna 131.

The RAM 140 comprises a volatile memory and is used as the work area for the processor 180 to temporarily store data for executing various procedures.

The ROM 150 comprises a nonvolatile memory such as a flash memory and stores programs for the processor 180 to control various functions (for example, programs for realizing the time correction procedure, offset information acquisition procedure, and time difference acquisition procedure described later) and various data. The various data include map information that is information associating locations (latitudes and longitudes) and time differences. The map information is information also called time zones.

The operation member 160 comprises operation buttons, a touch panel, and the like, and serves as an interface used by the user for entering orders.

The display 170 comprises, for example, a liquid crystal display (LCD), electroluminance (EL) display, or the like, and displays images according to image data entered from the processor 180.

The processor 180 comprises a central processing unit (CPU) and the like. The processor 180 executes various programs stored in the ROM 150 to control the entire operation of the central 100.

Here, the functional configuration of the processor 180 of the central 100 is described.

The processor 180 functions as an advertisement reception controller 181, a connection request transmission controller 182, a disconnection request transmission controller 183, an offset information creator 184, a time difference acquirer 185, an updated time information transmission controller 186, a connection type determiner 187, a counter 188, and a clock signal generator 189. Here, the functional configuration may be configured by a single processor 180 as in this embodiment or configured by multiple processors.

The advertisement reception controller 181 makes the short range wireless communicator 120 receive an advertisement transmitted from the peripheral 200 based on a scan order. The advertisement is notice information for the peripheral 200 to notify the central 100 of its own presence. A user operation for the scan order on the central 100 may be activation of an application for the peripheral 200 to use the services. Moreover, the scan order is not restricted to by a user operation and may be given periodically after the application is activated.

The connection request transmission controller 182 makes the short range wireless communicator 120 transmit a signal presenting a connection request to request connection of the peripheral 200. The connection request is transmitted when connection is necessary after an advertisement transmitted from the peripheral 200 is received.

The disconnection request transmission controller 183 makes the short range wireless communicator 120 transmit a signal presenting a disconnection request to make a disconnection request for disconnecting the connected peripheral 200. The disconnection request is transmitted, for example, when data communication with the connected peripheral 200 ends or when the user conducts a disconnection operation.

The offset information creator 184 creates offset information. The offset information created by the offset information creator 184 includes first offset information and second offset information.

The first offset information is a time difference between time information included in an NTP packet received from an NTP server 10 and the time measured by the counter 188. The second offset information is a time difference between time information created from radio waves received from the satellite 40 and the time measured by the counter 188.

For creating the first offset information, the offset information creator 184 makes the wireless communicator 110 communicate with the NTP pool server 20 and receive NTP packets from NTP servers 10 assigned by the NTP pool server 20. For creating the second offset information, the offset information creator 184 makes the satellite radio waves receiver 130 receive radio waves from the satellite 40.

The time difference acquirer 185 acquires a time difference including a local time difference and a time difference due to the daylight saving time. The following three methods can be used for this acquisition.

In the first acquisition method, the time difference acquirer 185 makes the wireless communicator 110 receive NTP packets from NTP servers 10 and acquires from the map information stored in the ROM 150 a time difference corresponding to the location presented by the location information included in the received NTP packets.

In the second acquisition method, the time difference acquirer 185 makes the satellite radio waves receiver 130 receive radio waves from the satellite 40 and obtains the location based on the received radio waves. The time difference acquirer 185 acquires from the map information stored in the ROM 150 a time difference corresponding to the location obtained based on the radio waves.

In the third acquisition method, the time difference acquirer 185 makes the display 170 display a screen for asking the user to confirm the location and acquires a time difference according to a user operation entered from the operation member 160. For example, the time difference acquirer 185 makes the display 170 display the location acquired last time and conforms with the user whether to reuse the location to acquire a time difference.

For example, if the user selects OK on reuse, the time difference acquirer 185 acquires a time difference based on the location acquired last time. If the user selects NG on reuse, the time difference acquirer 185 makes the display 170 display a location input screen and acquires a time difference based on the location entered by the user.

Here, a local time difference and a time difference due to the daylight saving time are acquired by slightly different methods. The time difference acquirer 185 acquires a local time difference from the map information based on the location presented by the location information or the location obtained from the radio waves. The time difference acquirer 185 acquires a time difference due to the daylight saving time from the map information based on the location presented by the location information or the location obtained from the radio waves and the date presented by the time information.

The time difference is acquired basically periodically (for example, every 30 minutes). The time difference is also acquired when the processor 180 detects change of the communication business operator, when the airplane mode OFF is canceled by a user operation through the operation member 160, and when the processor 180 detects switching from an out-of-service area to a service area.

The updated time information transmission controller 186 creates updated time information based on the time measured by the counter 188, offset information created by the offset information creator 184, and time difference acquired by the time difference acquirer 185. Specifically, the updated time information is obtained by adding the offset information and time difference to the time measured by the counter 188. Here, the addition may be subtraction taking into account that a time difference can be negative or positive. The updated time information transmission controller 186 makes the short range wireless communicator 120 transmit the created updated time information to the peripheral 200.

The connection type determiner 187 determines what purpose the connection type received from the peripheral 200 indicates. The processor 180 executes the subsequent control processing according to the determination result. For example, if the purpose indicated by the connection type includes time correction, the time correction procedure described later is executed. The purpose indicated by the connection type includes, besides the time correction, search on the central 100 and various data communication.

The counter 188 counts the number of pulses of clock signals generated by the clock signal generator 189 and measures the time based on the counted number of pulses. Moreover, the processor 180 executes various controls with timing based on the number of pulses counted by the counter 188.

The clock signal generator 189 generates clock signals of its own device (the central 100). Here, the processor 180 controls the frequency of clock signals of the clock signal generator 189 as appropriate upon time synchronization according to a signal received from another device.

The configuration of the central 100 according to this embodiment is described above. The configuration of the peripheral 200 according to this embodiment will be described hereafter.

Figure 3:
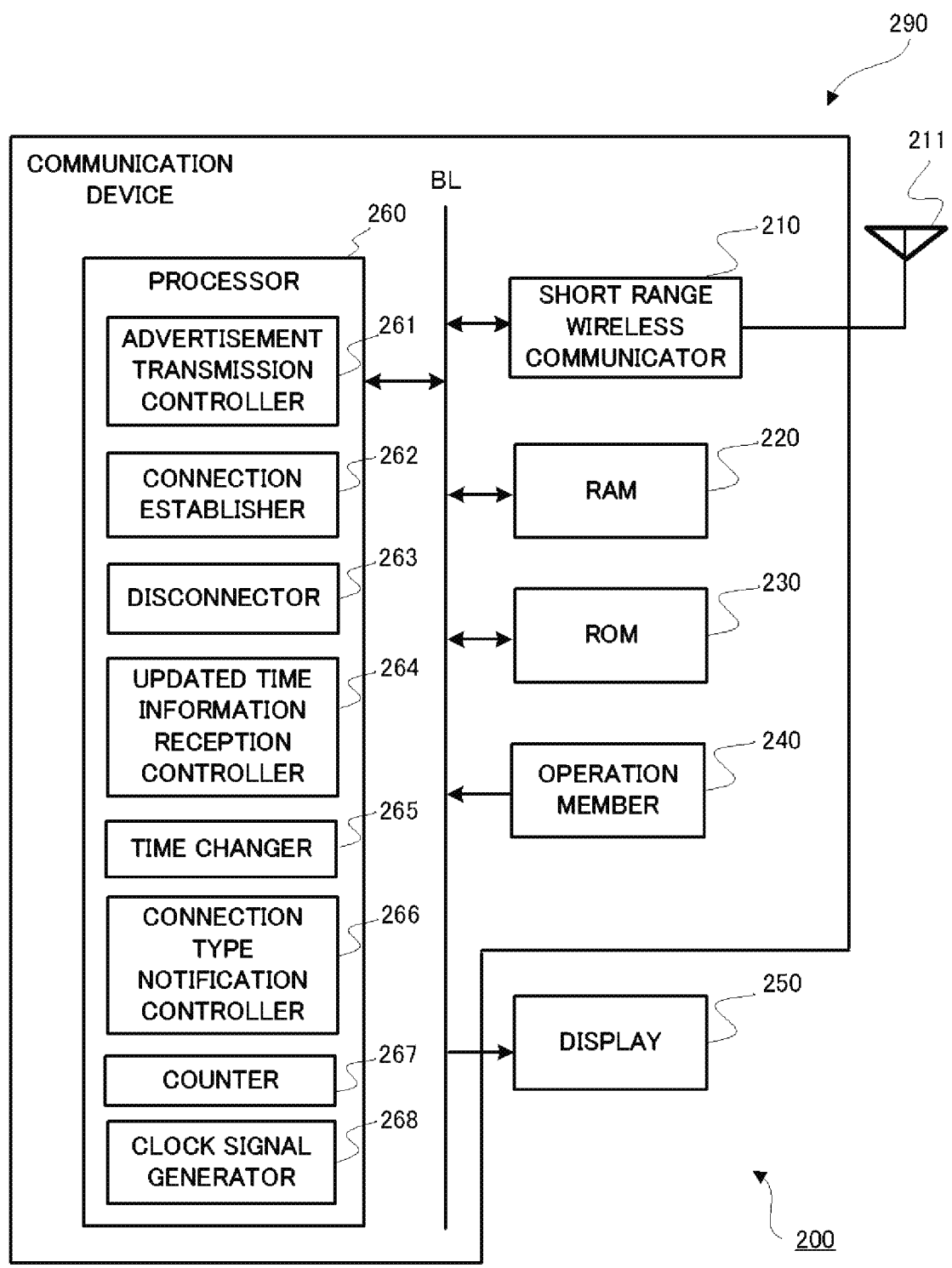
FIG. 3 is a block diagram showing an exemplary configuration of the peripheral according to the embodiment.

As shown in FIG. 3, the peripheral 200 comprises a communication device 290 and a display 250. The communication device 290 comprises a short range wireless communicator 210, an RAM 220, an ROM 230, an operation member 240, and a processor 260. These components of the communication device 290 and the display 250 are mutually connected by a bus line BL.

The short range wireless communicator 210 comprises, for example, an RF circuit, BB circuit, LSI circuit, or the like. The short range wireless communicator 210 wirelessly communicates with the central 100 that is another wireless communication device based on the BLE via an antenna 211.

The RAM 220 comprises a volatile memory and is used as the work area for the processor 260 to temporarily store data for executing various procedures.

The ROM 230 comprises a nonvolatile memory such as a flash memory and stores programs for the processor 260 to control various functions (for example, programs for executing the time correction procedure described later) and data.

The operation member 240 comprises a touch panel and the like, and serves as an interface for receiving user operations.

The display 250 comprises, for example, an LCD, EL display, or the like, and displays images according to image data entered from the processor 260.

The processor 260 is a processor and comprises a CPU and the like. The processor 260 executes various programs stored in the ROM 230 to control the entire operation of the peripheral 200.

Here, the functional configuration of the processor 260 of the peripheral 200 is described. The processor 260 functions as an advertisement transmission controller 261, a connection establisher 262, a disconnector 263, an updated time information reception controller 264, a time changer 265, a connection type notification controller 266, a counter 267, and a clock signal generator 268. Here, the functional configuration may be configured by a single processor 260 as in this embodiment or configured by multiple processors.

The advertisement transmission controller 261 transmits an advertisement to the central 100 via the short range wireless communicator 210 and antenna 211. An advertisement is transmitted periodically in accordance with the processing of programs or when a user operation occurs.

Receiving a connection request from the central 100 via the antenna 211 and short range wireless communicator 210, the connection establisher 262 establishes connection to the central 100. This establishment of connection enables data communication with the central 100.

Receiving a disconnection request for disconnecting from the central 100 via the antenna 211 and short range wireless communicator 210, the disconnector 263 disconnects from the central 100.

The updated time information reception controller 264 makes the short range wireless communicator 210 receive updated time information from the central 100.

The time changer 265 changes the time measured by the counter 267 based on the received updated time information. Moreover, the time changer 265 makes the display 250 display the changed time.

The connection type notification controller 266 makes the short range wireless communicator 210 transmit a connection type to notify the central 100.

Here, the connection type is information indicating the purpose for the peripheral 200 making connection to the central 100. The connection type is determined by the content of a user operation on the peripheral 200. For example, the processor 260 of the peripheral 200 sets the type for paring establishment when the user presses and holds an operation button of the operation member 240 of the peripheral 200, and sets the type for normal connection and data communication when the user presses an operation button shortly.

The counter 267 counts the number of pulses of clock signals generated by the clock signal generator 268 and measures the time based on the counted number of pulses. Moreover, the processor 260 executes various controls with timing based on the number of pulses counted by the counter 267.

The clock signal generator 268 generates clock signals of its own device (the peripheral 200). Here, the processor 260 controls the frequency of clock signals of the clock signal generator 268 upon time synchronization according to a signal received from another device.

Figure 4:
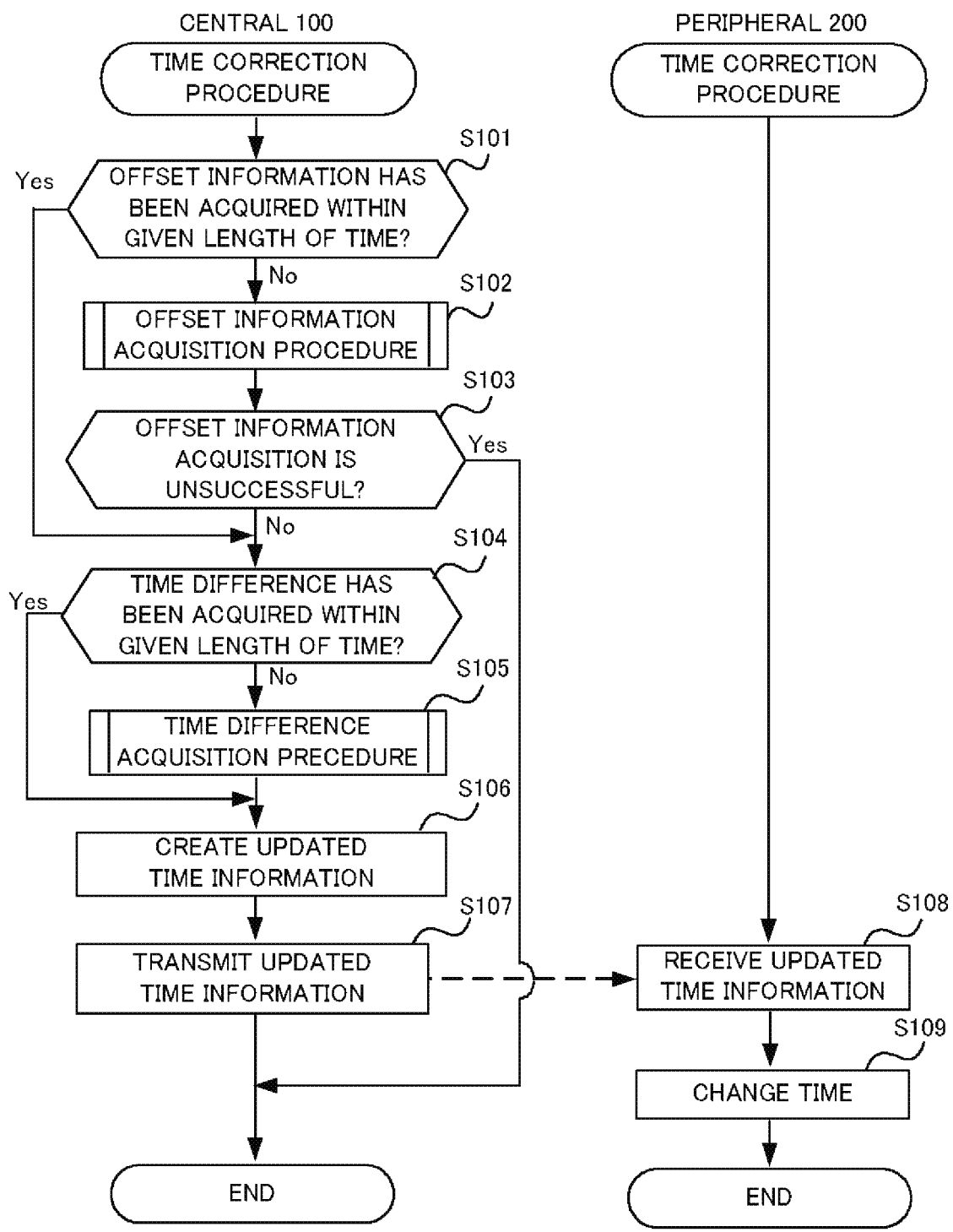
FIG. 4 is a flowchart showing an example of the time correction procedure of the central and peripheral.

The configuration of the peripheral 200 according to this embodiment is described above. The time correction procedure of the central 100 and peripheral 200 will be described hereafter with reference to FIG. 4.

This procedure is executed when connection between the central 100 and peripheral 200 is established and the connection type the central 100 receives from the peripheral 200 includes time correction as a purpose. The time correction procedure between the central 100 and peripheral 200 is periodically repeated or executed as triggered by a user operation. Here, it is assumed that the time information received/transmitted in the time correction procedure is corrected for time delay. This correction is made in the same manner as in the prior art time correction and its detailed explanation is omitted.

As this procedure is executed, first, the processor 180 of the central 100 determines whether offset information has been acquired within a given length of time (Step S101). This given length of time is a time over which deviation of the time measured by the counter 188 falls within an acceptable range and the processing load or power consumption of this procedure does not become excessive. The given length of time is set, for example, to six hours during the manufacturing or through a setting operation by the user.

If the processor 180 of the central 100 determines that no offset information has been acquired within the given length of time (Step S101; No), the processor 180 of the central 100 executes the offset information acquisition procedure (Step S102). The offset information acquisition procedure is a procedure to acquire the above-described first offset information.

On the other hand, if the processor 180 of the central 100 determines that offset information has been acquired within the given length of time (Step S101; Yes), Steps S102 and S103 described later are skipped. In such a case, the offset information acquired last time is used in the subsequent processing (Steps S104 to S109).

Figure 5:
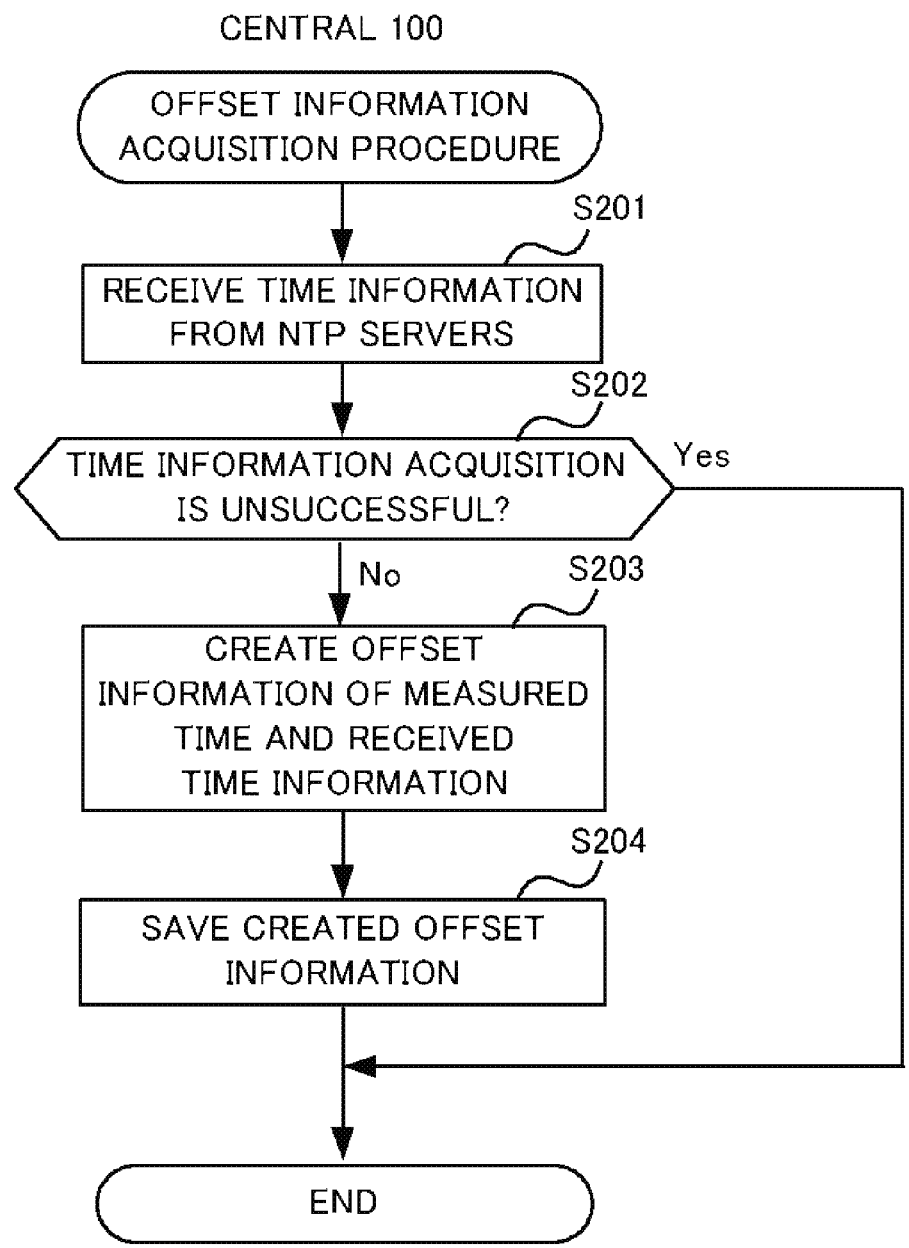
FIG. 5 is a flowchart showing an example of the offset information acquisition procedure of the central.

Here, details of the offset information acquisition procedure are described with reference to FIG. 5.

First, the processor 180 of the central 100 makes the wireless communicator 110 receive NTP packets (including time information) from the NTP servers 10 (Step S201). Here, the central 100 receives multiple NTP packets because they are received from multiple NTP servers 10.

This is because the NTP pool server 20 assigns multiple NTP servers 10 to the central 100. The processor 180 of the central 100 selects NTP packets having response times (round trip values) shorter than a given reference value (for example, 200 ms) among the received multiple NTP packets, and uses as effective data an NTP packet at the highest level in the stratum hierarchy structure among those packets.

The processor 180 of the central 100 determines whether the acquisition of time information is unsuccessful (Step S202).

If the processor 180 of the central 100 determines that the acquisition of time information is successful (Step S202; No), the processor 180 of the central 100 creates offset information of the measured time and the received time information (Step S203). The processor 180 of the central 100 saves the created offset information in the ROM 150 (Step S204). Then, the offset information acquisition procedure ends.

On the other hand, if the processor 180 of the central 100 determines that the acquisition of time information is unsuccessful (Step S202; Yes), the processor 180 of the central 100 skips the Steps S203 and S204 and ends the offset information acquisition procedure. Here, the acquisition of time information is determined to be unsuccessful also when the time from starting the offset information acquisition procedure to receiving NTP packets is equal to or longer than a timeout period (for example, 500 ms).

Details of the offset information acquisition procedure are described above. Then, returning to FIG. 4, explanation of the time correction procedure will be continued.

As the offset information acquisition procedure (Step S102) ends, the processor 180 of the central 100 determines whether the offset information acquisition is unsuccessful (Step S103).

If the processor 180 of the central 100 determines that the offset information acquisition is unsuccessful (Step S103; Yes), the processor 180 of the central 100 skips the subsequent processing (Steps S104 to S107) and ends the time correction procedure. In such a case, the processor 180 of the central 100 transmits no updated time information. Therefore, the time correction procedure ends without the processor 260 of the peripheral 200 executing the subsequent processing (Steps S108 and S109).

On the other hand, if the processor 180 of the central 100 determines that the offset information acquisition is successful (Step S103; No), or determines that offset information has been acquired within the given length of time (Step S101; Yes), the processor 180 of the central 100 determines whether a time difference has been acquired within a given length of time (Step S104). This given length of time is preset in consideration of a traveling time required for travelling that causes a time difference (for example, travelling to a foreign country). The given length of time is set, for example, to 30 minutes during the manufacturing or through a setting operation by the user.

If the processor 180 of the central 100 determines that no time difference has been acquired within the given length of time (Step S104; No), the processor 180 of the central 100 executes the time acquisition procedure (Step S105).

Figure 6:
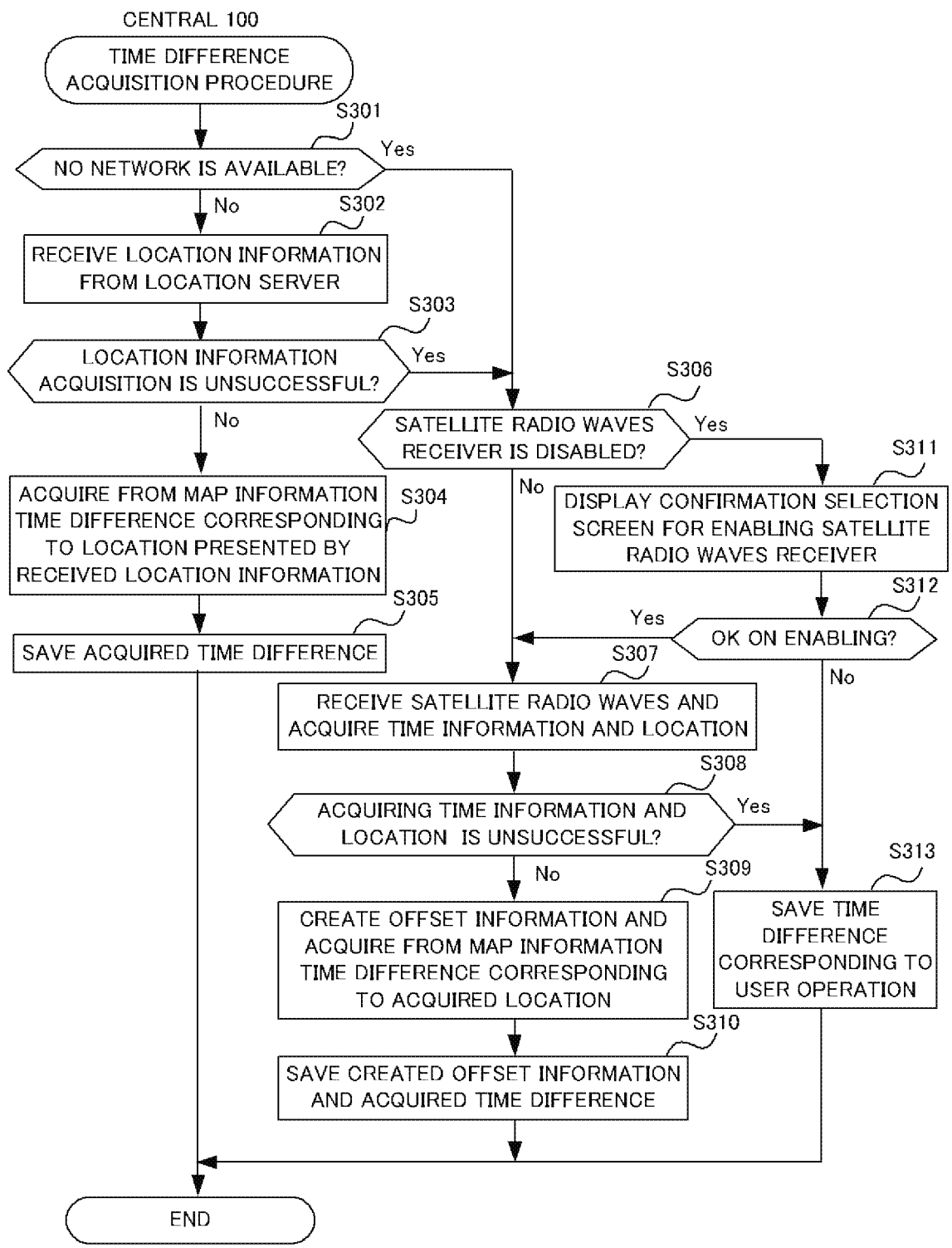
FIG. 6 is a flowchart showing an example of the time difference acquisition procedure of the central.

Here, details of the time difference acquisition procedure are described with reference to FIG. 6.

First, the processor 180 of the central 100 determines whether no network is available (Step S301). Whether no network is available means whether the central 100 is unconnectable to the WAN 50 via the wireless communicator 110.

If the processor 180 of the central 100 determines that a network is available (Step S301; No), the processor 180 of the central 100 makes the wireless communicator 110 receive location information from the location server 30 (Step S302).

Subsequently, the processor 180 of the central 100 determines whether the acquisition of location information is unsuccessful (Step S303).

If the processor 180 of the central 100 determines that the acquisition of location information is successful (Step S303; No), the processor 180 of the central 100 acquires a time difference by the above-described first acquisition method. Specifically, the processor 180 of the central 100 acquires a time difference corresponding to the location of the location information received from the location server 30 from the map information stored in the ROM 150 (Step S304). The processor 180 of the central 100 saves the acquired time difference (Step S305). Then, the time difference acquisition procedure ends.

On the other hand, if the processor 180 of the central 100 determines that no network is available (Step S301; Yes), or determines that the acquisition of location information is unsuccessful (Step S303; Yes), the processor 180 of the central 100 determines whether the satellite radio waves receiver 130 is disabled (Step S306).

If the processor 180 of the central 100 determines that the satellite radio waves receiver 130 is disabled (Step S306; Yes), the processor 180 of the central 100 makes the display 170 display a confirmation selection screen for asking for enabling the satellite radio waves receiver 130 (Step S311).

The processor 180 of the central 100 determines whether the user has selected OK on enabling while the confirmation selection screen is displayed (Step S312).

If the processor 180 of the central 100 determines that the satellite radio waves receiver 130 is enabled (Step S306; No), or if the user has selected OK on enabling the satellite radio waves receiver 130 (Step S312; Yes), the processor 180 of the central 100 makes the satellite radio waves receiver 130 receive radio waves from the satellite 40 and creates and acquires time information and a location based on the received radio waves (Step S307). Subsequently, the processor 180 of the central 100 determines whether the acquisition of time information and a location based on radio waves is unsuccessful (Step S308).

If the processor 180 of the central 100 determines that the user has selected NG on enabling, not OK on enabling, while the confirmation selection screen is displayed (Step S312; No), or the processor 180 of the central 100 determines that the acquisition of time information and a location based on radio waves is unsuccessful (Step S308; Yes), the processor 180 of the central 100 acquires and saves in the ROM 150 a time difference corresponding to a user operation by the above-described third acquisition method (Step S313). Then, the time difference acquisition procedure ends.

On the other hand, if the processor 180 of the central 100 determines that the acquisition of time information and a location based on radio waves is successful (Step S308; No), the processor 180 of the central 100 creates the above-described second offset information and acquires a time difference by the above-described second acquisition method (Step S309).

Specifically, the processor 180 of the central 100 creates offset information that is a time difference between the time measured by the counter 188 and the time information based on the received radio waves. Moreover, the processor 180 of the central 100 obtains a location based on the received radio waves and acquires a time difference corresponding to the location from the map information stored in the ROM 150.

Subsequently, the processor 180 of the central 100 saves the created offset information and acquired time difference in the ROM 150 (Step S310). Then, the time difference acquisition procedure ends.

Details of the time difference acquisition procedure are described above. Then, returning to FIG. 4, explanation of the time correction procedure will be continued.

The processor 180 of the central 100 creates updated time information based on the offset information and time difference acquired (saved in the ROM 150) in the preceding processing (Step S106). The processor 180 of the central 100 makes the short range wireless communicator 120 transmit the created updated time information to the peripheral 200 (Step S107).

The processor 260 of the peripheral 200 makes the short range wireless communicator 210 receive the updated time information transmitted from the central 100 (Step S108). The processor 260 of the peripheral 200 changes the time measured by the counter 267 and makes the display 250 display the changed time (Step S109). Then, the time correction procedure ends.

As described above, in the communication system 1 according to this embodiment, the central 100 creates first offset information based on time information from the NTP servers 10 and acquires a time difference corresponding to the location presented by location information received from the location server 30. Then, the central 100 creates updated time information based on the first offset information and acquired time difference and transmits the updated time information to the peripheral 200. The peripheral 200 changes the displayed time based on the received updated time information.

The time information from the NTP servers 10 is more accurate than time data provided from a carrier network.

Therefore, with the above configuration, the displayed time of the peripheral 200 is improved in accuracy.

Moreover, in the communication system 1 according to this embodiment, when the central 100 fails to receive location information from the location server 30, the central 100 creates second offset information based on time information created based on radio waves received from the satellite 40 and acquires a time difference corresponding to the location obtained based on radio waves received from the satellite 40. Then, the central 100 creates updated time information based on the second offset information and acquired time difference and transmits the updated time information to the peripheral 200. The peripheral 200 changes the displayed time based on the received updated time information.

The time information created based on radio waves received from the satellite 40 is more accurate than time data provided from a carrier network. Therefore, with the above configuration, the displayed time of the peripheral 200 is improved in accuracy.

When the satellite radio waves receiver 130 is enabled and the function of receiving radio waves from the satellite 40 is used, the processing load and power consumption are accordingly increased. However, with the above configuration, the central 100 receives radio waves from the satellite 40 only when the central 100 fails to receive location information from the location server 30. Therefore, it is possible to shorten the length of time for which the satellite radio waves receiver 130 is enabled so as to suppress increase in the processing load and power consumption.

An embodiment is described above. The above embodiment is given by way of example. Therefore, specific configurations of the central 100 and peripheral 200 and details of the procedures are not confined to what is described in the above embodiment. Modified embodiments of the above embodiment will be described hereafter.

(Modified Embodiments)

In the above embodiment, the central 100 is so configured that the processor 180 functions as the counter 188 and clock signal generator 189 and the peripheral 200 is so configured that the processor 260 functions as the counter 267 and clock signal generator 268. However, the present disclosure is not confined to such configurations.

For example, the counters 188 and 267 and clock signal generators 189 and 268 may be configured as real time clock (RTC) modules separate from the processors 180 and 260. Here, an RTC module comprises a counter circuit counting the number of pulses of clock signals of its own device, a quartz-crystal oscillator generating a reference clock, a variable phase locked loop (PLL) generating clock signals of a desired frequency from the reference clock, and the like.

In the above embodiment, the processor 180 of the central 100 ends the offset information acquisition procedure when the acquisition of time information from the NTP servers 10 is unsuccessful (Strep S202; Yes) in the offset information acquisition procedure. However, the processor 180 of the central 100 may be configured to make the satellite radio waves receiver 130 receive radio waves from the satellite 40 and acquire the second offset information instead of ending the offset information acquisition procedure.

In such a case, it is possible to create updated time information based on the second offset information and transmit the updated time information to the peripheral 200 even if the offset information acquisition procedure is unsuccessful. Therefore, with such a configuration, the time correction procedure can more reliably be executed.

In the above embodiment, the processor 180 of the central 100 is configured to periodically acquire a time difference as a rule. Moreover, the intervals of periodic acquisition of a time difference are not changed. However, the present disclosure is not confined to such a configuration.

For example, the processor 180 of the central 100 may be configured to set the intervals of periodic acquisition of a time difference to 30 minutes when no network is available, and change the intervals of periodic acquisition of a time difference to 15 minutes when a network is available. Moreover, the processor 180 of the central 100 may be configured to change the intervals of periodic acquisition of a time difference depending on the remaining battery level of the central 100. In other words, the processor 180 of the central 100 may be configured to shorten the intervals when the remaining battery level of the central 100 is high.

In the above embodiment, the central 100 and peripheral 200 store acquired data in the ROM 150 and ROM 230, respectively. However, the present disclosure is not confined to such a configuration. The central 100 and peripheral 200 may be configured to store acquired data in the RAM 140 and RAM 220, not in the ROM 150 and ROM 230. In other words, data can be stored in any storage including an RAM and ROM.

In the above embodiment, the central 100 creates and transmits to the peripheral 200 updated time information and the peripheral 200 changes the time measured by its own device based on the updated time information. The central 100 does not change the time measured by its own device based on the updated time information. However, the present disclosure is not confined to such a configuration. For example, the central 100 may be configured to create updated time information and change the time measured by its own device based on the updated time information. Moreover, the central 100 may be configured to display the changed time on the display 170.

In the above embodiment, the central 100 and peripheral 200 wirelessly communicating with each other based on the BLE exemplify wireless communication devices. However, the present disclosure is not confined to wireless communication devices wirelessly communicating based on the BLE. For example, the present disclosure may be wireless communication devices wirelessly communicating based on the Wi-Fi (registered trademark), ZigBee (registered trademark), or the like. Moreover, the central 100 may be configured to perform wired communication, not wireless communication using the wireless communicator 110. In other words, the wireless communicator 110 may be a communicator. The short range wireless communicator 210 of the peripheral 200 may be a receiver.

Moreover, the central 100 and peripheral 200 according to the present disclosure are not restricted to the above-described wireless communication devices and, for example, computers may execute programs to realize the function of the central 100 and the function of the peripheral 200. The programs for realizing the function of the central 100 and the function of the peripheral 200 may be stored in a non-transitory computer-readable recording medium such as a universal serial bus (USB) memory, compact disc read only memory (CD-ROM), digital versatile disc (DVD), and hard disc drive (HDD), or downloaded on a computer via a network.

In the above embodiment, the central 100 acquires time information from the NTP servers 10. However, the present disclosure is not confined to such a configuration. The central 100 may acquire time information from, for example, time servers complying with some other protocols such as simple network time protocol (SNTP) servers.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The present disclosure is based on Japanese Patent Application No. 2016-038536, filed on Mar. 1, 2016, of which the specification, scope of claims, and drawings are entirely incorporated herein by reference.

REFERENCE SIGNS LIST

1 Communication system
10 NTP server
20 NTP pool server
30 Location server
40 Satellite
50 WAN
100 Central
200 Peripheral
110 Wireless communicator
120, 210 Short range wireless communicator
130 Satellite radio waves receiver
111, 121, 131, 211 Antenna
140, 220 RAM
150, 230 ROM
160, 240 Operation member
170, 250 Display
180, 260 Processor
190, 290 Communication device
181 Advertisement reception controller
182 Connection request transmission controller
183 Disconnection request transmission controller
184 Offset information creator
185 Time difference acquirer
186 Updated time information transmission controller
187 Connection type determiner
188, 267 Counter
189, 268 Clock signal generator
261 Advertisement transmission controller
262 Connection establisher
263 Disconnector
264 Updated time information reception controller
265 Time changer
266 Connection type notification controller

The invention claimed is:

1. A communication device, comprising:
a processor configured to:
  measure time;
  determine whether a communicator is able to receive location information and time information from a server;
  in response to determining that the communicator is able to receive the location information and the time information from the server:
    control the communicator to receive the location information and the time information from the server;
    create first offset information of the measured time and the time information received by the communicator;
    acquire, from map information that is information associating locations and time differences stored in a memory, a time difference corresponding to a location presented by the location information received by the communicator;
    create first updated time information based on the measured time, the first offset information, and the time difference corresponding to the location presented by the location information received by the communicator; and
    control the communicator to transmit the first updated time information to another communication device; and
  in response to determining that the communicator is not able to receive the location information and the time information from the server:
    control a satellite radio waves receiver to receive radio waves from a satellite;
    create second offset information of the measured time and time information created based on the radio waves received by the satellite radio waves receiver;
    acquire from the map information a time difference corresponding to a location obtained based on the radio waves received by the satellite radio waves receiver;
    create second updated time information based on the measured time, second offset information, and time difference corresponding to the location obtained based on the radio waves received by the satellite radio waves receiver; and
    control the communicator to transmit the second updated time information to the another communication device.

2. The communication device according to claim 1, wherein the processor is configured to determine whether a network is available for the communicator to communicate with the server to determine whether the communicator is able to receive location information and time information from the server.

3. The communication device according to claim 1, wherein the time difference acquired in response to determining that the communicator is able to receive the location information and the time information from the server and the time difference acquired in response to determining that the communicator is not able to receive the location information and the time information from the serve comprises a local time difference and a time difference due to the daylight saving time.

4. The communication device according to claim 1, wherein the server comprises network time protocol (NTP) servers and a location server.

5. A communication system comprising:
the first communication device according to claim 1; and
the second communication device.

6. A communication method including:
measuring time;
determining whether a communicator is able to receive location information and time information from a server;
in response to determining that the communicator is able to receive the location information and the time information from the server:

controlling the communicator to receive the location information and the time information from the server;
creating first offset information of the measured time and the time information received by the communicator;
acquiring, from map information that is information associating locations and time differences stored in a memory, a time difference corresponding to a location presented by the location information received by the communicator;
creating first updated time information based on the measured time, the first offset information, and the time difference corresponding to the location presented by the location information received by the communicator; and
controlling the communicator to transmit the first updated time information to another communication device; and in response to determining that the communicator is not able to receive the location information and the time information from the server:
controlling a satellite radio waves receiver to receive radio waves from a satellite;
creating second offset information of the measured time and time information created based on the radio waves received by the satellite radio waves receiver;
acquiring from the map information a time difference corresponding to a location obtained based on the radio waves received by the satellite radio waves receiver;
creating second updated time information based on the measured time, second offset information, and time difference corresponding to the location obtained based on the radio waves received by the satellite radio waves receiver; and
controlling the communicator to transmit the second updated time information to the another communication device.

7. A non-transitory computer-readable recording medium storing a program for causing a computer to at least perform:
measuring time;
determining whether a communicator is able to receive location information and time information from a server;
in response to determining that the communicator is able to receive the location information and the time information from the server:
controlling the communicator to receive the location information and the time information from the server;
creating first offset information of the measured time and the time information received by the communicator;
acquiring, from map information that is information associating locations and time differences stored in a memory, a time difference corresponding to a location presented by the location information received by the communicator;
creating first updated time information based on the measured time, the first offset information, and the time difference corresponding to the location presented by the location information received by the communicator; and
controlling the communicator to transmit the first updated time information to another communication device; and in response to determining that the communicator is not able to receive the location information and the time information from the server:
controlling a satellite radio waves receiver to receive radio waves from a satellite;
creating second offset information of the measured time and time information created based on the radio waves received by the satellite radio waves receiver;
acquiring from the map information a time difference corresponding to a location obtained based on the radio waves received by the satellite radio waves receiver;
creating second updated time information based on the measured time, second offset information, and time difference corresponding to the location obtained based on the radio waves received by the satellite radio waves receiver; and
controlling the communicator to transmit the second updated time information to the another communication device.

8. A first communication device comprising:
a first processor configured to measure time and perform control operations; and
a receiver configured to receive, from a second communication device, first updated time information and a second updated time information, wherein the second communication device comprises a communicator and a second processor configured to:
measure time;
determine whether the communicator is able to receive location information and time information from a server;
in response to determining that the communicator is able to receive the location information and the time information from the server:
control the communicator to receive the location information and the time information from the server;
create first offset information of the measured time and the time information received by the communicator;
acquire, from map information that is information associating locations and time differences stored in a memory, a time difference corresponding to a location presented by the location information received by the communicator;
create first updated time information based on the measured time, the first offset information, and the time difference corresponding to the location presented by the location information received by the communicator; and
control the communicator to transmit the first updated time information to the first communication device; and
in response to determining that the communicator is not able to receive the location information and the time information from the server:
control a satellite radio waves receiver to receive radio waves from a satellite;
create second offset information of the measured time and time information created based on the radio waves received by the satellite radio waves receiver;
acquire from the map information a time difference corresponding to a location obtained based on the radio waves received by the satellite radio waves receiver;

create second updated time information based on the measured time, second offset information, and time difference corresponding to the location obtained based on the radio waves received by the satellite radio waves receiver; and control the communicator to transmit the second updated time information to the first communication device, wherein the first processor is configured to change the time measured by the first processor based on the first updated time information received or the second updated time information received by the receiver.

9. An electronic watch comprising:

the first communication device according to claim 8; and a display configured to display the time measured by the first processor.

\* \* \* \* \*

UNITED STATES PATENT AND TRADEMARK OFFICE
CERTIFICATE OF CORRECTION

PATENT NO. : 11,307,537 B2
APPLICATION NO. : 16/081065
DATED : April 19, 2022
INVENTOR(S) : Hiroshi Iwamiya et al.

It is certified that error appears in the above-identified patent and that said Letters Patent is hereby corrected as shown below:

In the Claims

Column 14, Claim 3, Line 52 should read:
tion from the server comprises a local time difference Signed and Sealed this
Twenty-eighth Day of February, 2023

Katherine Kelly Vidal
*Director of the United States Patent and Trademark Office*